United States Patent [19]
Hatori et al.

[11] Patent Number: 5,566,258
[45] Date of Patent: Oct. 15, 1996

[54] WAVEGUIDE TYPE ELECTRO-OPTICAL ELEMENT COMPRISING MATERIAL HAVING SPECIFIC RESISTANCE RANGING BETWEEN 107-1011 OMEGA CM

[75] Inventors: Masami Hatori; Takashi Yamada; Shinichiro Sonoda, all of Kanagawa-ken, Japan

[73] Assignee: Fuji Photo Film Co., Ltd., Kanagawa, Japan

[21] Appl. No.: 487,517

[22] Filed: Jun. 7, 1995

[30] Foreign Application Priority Data

Jul. 1, 1994 [JP] Japan .................. 6-150773

[51] Int. Cl.$^6$ ........................................ G02B 6/10
[52] U.S. Cl. ............................... 385/8; 385/10
[58] Field of Search .................... 385/2, 3, 8, 9, 385/10

[56] References Cited

U.S. PATENT DOCUMENTS

| | | | |
|---|---|---|---|
| 5,153,934 | 10/1992 | Okayama et al. | 385/8 |
| 5,214,724 | 5/1993 | Seino et al. | 385/8 |
| 5,388,170 | 2/1995 | Heismann et al. | 385/8 |

FOREIGN PATENT DOCUMENTS 2931  1/1990  Japan .................. G02F 1/335

OTHER PUBLICATIONS

DC Drift Phenomena in LiNbO$_3$ Optical Waveguide Devices, Yamada et al., Japanese Journal of Applied Physics, vol. 20, No. 4, Apr., 1981, pp. 733–737.

Primary Examiner—John Ngo
Attorney, Agent, or Firm—Sughrue, Mion, Zinn, Macpeak & Seas

[57] ABSTRACT

A waveguide type electro-optical element is made up of a proton-exchanged optical waveguide formed on a substrate which possesses an electro-optical effect. At least one pair of electrodes is formed on the substrate adjacent to the optical waveguide with a buffer layer being disposed between the substrate and the electrodes. A guide beam propagating through the waveguide is diffracted as a result of the application of a voltage to the electrodes. The buffer layer is made of material which has a specific resistance ranging between $10^7$–$10^{11}$ Ωcm. The optical waveguide may be of a form having a split-type optical waveguide consisting of the combination of two Y-shaped waveguides, and a pair of channel optical waveguides constituting a directional coupler.

7 Claims, 3 Drawing Sheets

WAVEGUIDE TYPE ELECTRO-OPTICAL ELEMENT COMPRISING MATERIAL HAVING SPECIFIC RESISTANCE RANGING BETWEEN 107-1011 OMEGA CM

BACKGROUND OF THE INVENTION

1. Field of the Invention

This invention relates to a waveguide type electro-optical element comprising an optical waveguide formed on a substrate possessing an electro-optical effect, and at least a pair of electrodes formed on the optical waveguide. The waveguide type electro-optical element is designed to effect modulation and switching of guided light by application of a voltage to the electrodes.

2. Description of the Prior Art

A waveguide type electro-optical element has already been known such as disclosed, for example, in Unexamined Japanese Patent Publn. No. HEI-2(1990)-931 incorporated herein by reference. The electro-optical element comprises a thin film optical waveguide formed on a substrate possessing an electro-optical effect, a grid-shaped electrode (hereinafter referred to as an EOG electrode) being formed on the substrate and constituting electro-optical gratings in the optical waveguide, and a drive circuit for applying a voltage to this EOG electrode. Guided light, traveling through the optical waveguide, is selectively diffracted in accordance with a state of the application of voltage to the EOG electrode.

The use of such a waveguide type electro-optical element enables the modulation of light to be used in accordance with the existence or absence of diffraction or the degree of diffraction when either diffracted light or non-diffracted light (zeroth order light) is used as the light to be used. The use of the waveguide type electro-optical element also makes it possible to construct an optical switch which switches an optical path in accordance with the presence or absence of diffraction.

Another waveguide type electro-optical element is also disclosed, for example, in the Japanese Journal of Applied Physics, Vol. 20, No. 4 April, 1981, pp. 733 to 737, which is incorporated herein by reference. In this waveguide type electro-optical element, two channel optical waveguides which constitute a directional coupler are formed on a substrate possessing an electro-optical effect, and a planer electrode is provided on each channel optical waveguide. Guided light traveling through one of the channel optical waveguides is selectively switched to the other channel optical waveguide in accordance with application of a voltage to the electrode.

The use of such a waveguide type electro-optical element enables the modulation of light, being emitted from the other channel optical waveguide, in accordance with the state of the application of a voltage to the electrode, or makes it possible to constitute an optical switch which switches an optical path of the guided light.

In the waveguide type electro-optical element having such a construction, an optical buffer layer is often interposed between the electrodes and the substrate to prevent the scattering or absorption of light caused by the electrode. Conventionally, this buffer layer is made Of $SiO_2$ or $Al_2O_3$.

In a waveguide type electro-optical element comprising a proton-exchanged optical waveguide used as an optical waveguide and the above-mentioned buffer layer interposed between a substrate and electrodes, it is acknowledged that a sharp change in the temperature of the electro-optical element may cause guided light to be diffracted even though a voltage is not applied to the electrodes.

In this way, if the diffraction of the guided light occurs irrespective of the application of a voltage to the electrodes, it will be impossible to control the modulation of light or the switching of an optical path of guided light. Therefore, it will be difficult to construct an optical modulator and an optical switch which can be put into practical use by utilization of this waveguide type electro-optical element.

This invention is made in view of the foregoing drawbacks in the prior art, and the object of the present invention is to provide a waveguide type electro-optical element capable of preventing guided light from being diffracted if the temperature of the electro-optical element is sharply changed when no voltage is applied to the electrodes.

SUMMARY OF THE INVENTION

According to one aspect of the present invention, the above-mentioned object will be achieved by a waveguide type electro-optical element comprising a proton-exchanged waveguide formed on a substrate possessing an electro-optical effect, at least one pair of electrodes formed on the substrate closely adjacent to the waveguide with a buffer layer being interposed between the substrate and the electrodes, and a drive circuit for applying a voltage between the electrodes, wherein the buffer layer is made of material possessing a specific resistance ranging between $10^7$–$10^{11}$ $\Omega$cm.

In one preferred embodiment of the present invention, $HfO_2$ should preferably be used as the material of the buffer layer.

$SiO_2$ is generally used as the material for the buffer layer and has a considerably high specific resistance, as much as $10^{12}$ $\Omega$cm or more $Al_2O_3$ also has a similar specific resistance.

If material possessing a specific resistance of less than $10^{11}$ $\Omega$cm is used as material for a buffer layer, the diffraction of guided light caused without the application of a voltage to the electrodes when the temperature of an optical element is abruptly changed will be prevented. A possible reason for this will be explained as follows.

It is deemed that the light diffraction occurring when the temperature of the element is abruptly changed is due to a pyroelectric effect of the substrate. Specifically, when the temperature of the substrate is abruptly changed, electric charges of the substrate are separated from each other by virtue of the pyroelectric effect. At this time, electrodes may be aligned parallel to the direction of separation of the electric charges depending on a relative positional relationship between the crystallographic axis and the electrodes. In such a case, when a number of electrodes are aligned parallel one after another, one electrode collects positive electric charges; while the adjacent electrode collects negative electric charges. This is similar to the state in which a voltage is applied to the electrodes from the outside. Therefore, an electro-optical effect develops in the substrate, which in turn causes the diffraction of guided light.

On the other hand, if a buffer layer possessing a low specific resistance is interposed between the electrodes and the substrate, the electrodes will not collect electric charges, thereby preventing the previously-mentioned diffraction phenomenon.

To prevent the diffraction of guided light occurring irrespective of the application of a voltage, it is considered that the specific resistance of the material of the buffer layer preferably be as low as possible. On the other hand, if the specific resistance of the material of the buffer layer is too low, there will be continuity between the electrodes via the buffer layer, which will in turn make it impossible to apply a voltage to the electrodes. Such a problem is prevented so long as the material of the buffer layer has a specific resistance of at least approximately $10^7$ Ωcm (i.e., a specific resistance which is slightly smaller than the specific resistance of a proton-exchanged waveguide ordinarily ranging from $10^8$ to $10^{10}$ Ωcm). In the present invention, this value is taken as the minimum value for the specific resistance of the material of the buffer layer.

DESCRIPTION OF THE PREFERRED EMBODIMENTS

Referring to the accompanying drawings, a waveguide type electro-optical element according to the present invention will be described in detail hereunder.

Figure 1:
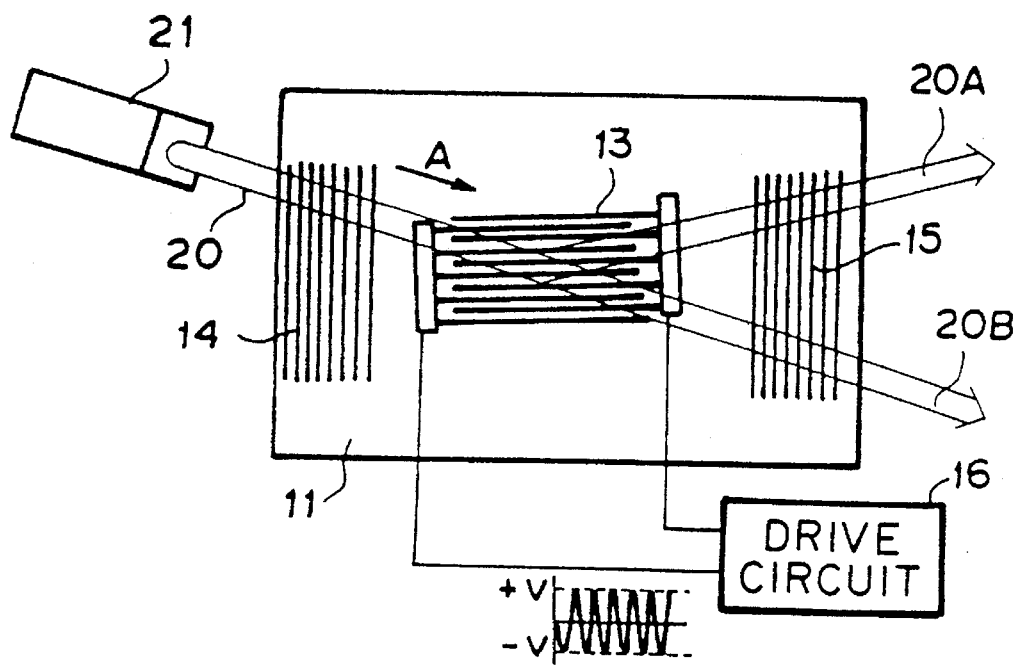
FIG. 1 is a plan view showing a waveguide type electro-optical element in a first embodiment of the present invention.
Figure 2:
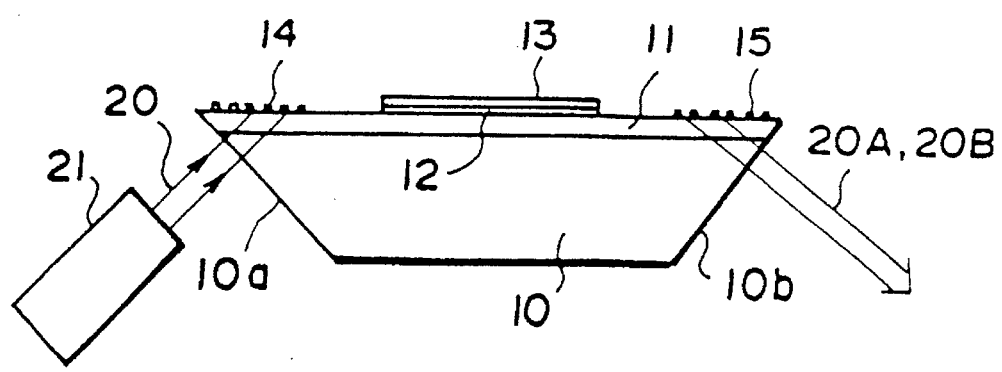
FIG. 2 is a side elevation view of the waveguide type electro-optical element shown in FIG. 1.

FIGS. 1 and 2 are plan and cross-sectional views of a waveguide type electro-optical element in a first embodiment of the present invention. This waveguide type electro-optical element is constructed as an optical modulator. The waveguide type electro-optical element comprises a thin film optical waveguide 11 formed on a $LiNbO_3$ substrate 10, a buffer layer 12 consisting of a $HfO_2$ film formed on the thin film optical waveguide 11; an EOG electrode 13 formed on the buffer layer 12; linear grating couplers (hereinafter referred to as LGCs) 14 for light input and LGCs 15 for light output, both being formed on the surface of the optical waveguide 11 while they are spaced apart from each other; and a drive circuit 16 which applies a predetermined a.c. voltage (preferably a high frequency voltage) to the EOG electrode 13.

The principal elements of the waveguide type electro-optical element will be manufactured as follows.

To begin with, the $LiNbO_3$ substrate (an X plate) doped with MgO was immersed into a pyrophosphoric acid, and the substrate was subjected to proton exchange at the temperature range 140° to 160° C. The proton-exchanged substrate was then annealed for 10 to 60 minutes at a temperature of 300° to 400° C. in the atmosphere, whereby the optical waveguide 11 is formed. In this case, the thus obtained optical waveguide 11 causes guided light to travel in a single mode with respect to $Ar^+$ and He—Ne laser beams.

Subsequently, a $HfO_2$ film which will act as the buffer layer 12 was formed on the optical waveguide 11 by employing the high frequency sputtering method. In this case, for example, 60 sccm (standard cc/min.) Ar gas and 72 sccm $O_2$ gas were introduced into a sputtering system. The partial pressure of $O_2$ gas was set to 40%, and the pressure of the mixed gas was set to $1\times10^{-2}$ Torr. While a metal Hf target was used as a cathode and the substrate 10 was used as the anode, a high frequency electric discharge was brought about by applying a voltage of 1 kW to the cathode in the atmosphere of a gas mixture consisting of the Ar gas and the $O_2$ gas. As a result of this, a $HfO_2$ film having a thickness of 100 nm was produced.

After the buffer layer 12, consisting of the $HfO_2$ had been formed in the manner as previously mentioned, the EOG electrode 13 was formed by a known method. Pitches between toothed electrode strips of the EOG electrode 13 were, for example, set to 5–20 μm.

The operation of the waveguide type electro-optical element having such a construction will now be described. A laser light source 21, such as an $Ar^+$ laser, which emits an optical beam 20 to be modulated is arranged in such a way that the optical beam 20, which is a collimated beam, passes through an obliquely sliced end face 10a of the substrate 10 and enters the LGCs 14 after having passed through the optical waveguide 11. As a result of this, the optical beam 20 is diffracted by the LGCs 14, and it enters the optical waveguide 11. The optical beam 20 then travels through the optical waveguide 11 in a guided mode in the direction designated by an arrow A.

The optical beam (guided light) 20 travels through the EOG electrode 13. When no voltage is applied to the EOG electrode 13, the guided beam 20 travels straight and forward. On the other hand, when a predetermined high-frequency-superimposed voltage is applied to the EOG electrode 13 from the drive circuit 16, a refractive index of the optical waveguide 11 is varied, and diffraction gratings are eventually formed in the optical waveguide 11. The guided beam 20 is diffracted by these diffraction gratings. A beam 20A diffracted in the manner previously mentioned, and a non-diffracted beam 20B are diffracted to the substrate 10 through the LGCs 15. The diffracted beams are emitted to the outside of the optical element from an obliquely sliced end face 10b of the substrate 10.

On the assumption that the beam emitted outside the element, for example, an optical beam 20A is taken as a beam to be used, it is possible to modulate the optical beam 20A in accordance with the presence or absence of the application of a voltage by the drive circuit 16. For example, when the optical beam 20A is modulated based on a predetermined image signal, a voltage applied from the drive circuit 16 is controlled based on that image signal.

A result of the study of operational stability of the waveguide type electro-optical element in this embodiment with respect to variations in temperature, will now be explained. An $Ar^+$ laser having an output of 10 mW was used as the laser light source 21, and the optical beam 20 emitted from the laser light source was guided into the optical waveguide 11 in the manner described above. The optical beam traveled through the waveguide.

When the output voltage of the drive circuit 16 was set to zero, no diffracted beam 20A appeared. Even when the waveguide type electro-optical element was heated by a drier in this state, no diffracted beam 20A appeared. The temperature of the electro-optical element was more than 50° C. A measured specific resistance of $HfO_2$ used as the material of the buffer layer in this embodiment was $10^9$–$10^{11}$ Ωcm, and the specific resistance of the proton-exchanged optical waveguide 11 was $10^8$–$10^{10}$ Ωcm.

A waveguide type electro-optical element having a buffer layer made of the same $SiO_2$ as used for a conventional buffer layer will now be explained. This waveguide type electro-optical element, used as a comparative example, is different only in the material of the buffer layer. Referring to reference numerals of FIGS. 1 and 2, the difference will be described.

The manufacturing method of the waveguide type electro-optical element of the comparative example is the same as that in the previously mentioned embodiment until the optical waveguide 11 is formed on the $LiNbO_3$ substrate (X substrate) doped with MgO. In this case, $SiO_2$ which will serve as the buffer layer 12 is formed on the optical waveguide 11 by high frequency sputtering. The high frequency sputtering was carried out under specific conditions: namely, 35 sccm Ar gas, 3.5 sccm $O_2$ gas, $1\times10^{-3}$ Torr mixed gas pressure, and 100 W high freqeuncy power.

A result of the study of operational stability of this comparative example, with respect to variations in temperature will be explained. An $Ar^+$ laser having an output power of 10 mW was used as the laser light source 21. The optical beam 20 emitted from the light source was introduced into the optical waveguide 11 in the manner as already mentioned, and the optical beam traveled through the waveguide.

When the output voltage of the drive circuit 16 was set to zero, no diffracted beam 20A appeared. When the waveguide type electro-optical element of this comparative diffracted beam 20A appeared within several seconds. The diffracted beam 20A kept appearing even after the heating of the element by the drier had been terminated. This state continued for several seconds sometimes lasting several tens of seconds. A measured specific resistance of $SiO_2$, serving as the material of the buffer layer in this comparative example, was more than $10^{12}$ Ωcm.

In this embodiment of the present invention, as mentioned above, it was ascertained that when the temperature of the optical element was suddenly changed, a guided beam was not diffracted without the application of a voltage to the EOG electrode 13 owing to the buffer layer 12 being made of $HfO_2$ which has a lower specific resistance, by magnitudes of more than one to three, compared with $SiO_2$. The operation of the optical element was also ascertained to be stable.

When the buffer layer 12 was made of a transparent conductive film consisting of $In_2O_3$ and $SnO_3$ in lieu of $HfO_2$, there was continuity between the toothed electrode strips of the EOG electrode 13 via the buffer layer 12 because the specific resistance of $In_2O_3$ and $SnO_3$ were as low as $1$–$10^3$ Ωcm. In this state, it was impossible to apply a voltage to the EOG electrode 13, which made it completely impossible to diffract a guided beam. Such a problem is prevented so long as the specific resistance of the material of the buffer layer is at least $10^7$ Ωcm or thereabouts.

The use of $HfO_2$ can prevent this problem and results in stable operation even when the temperature of the optical element is sharply changed as previously mentioned. Thus, $HfO_2$ is particularly desirable as the material of the buffer layer of the present invention. Moreover, when compared with $SiO_2$, $HfO_2$ has an effect of decreasing a drive voltage and has a very low optical propagation loss which is as low as 0.1 dB/cm or less. Hence, it is a desirable material for the buffer layer.

Figure 3:
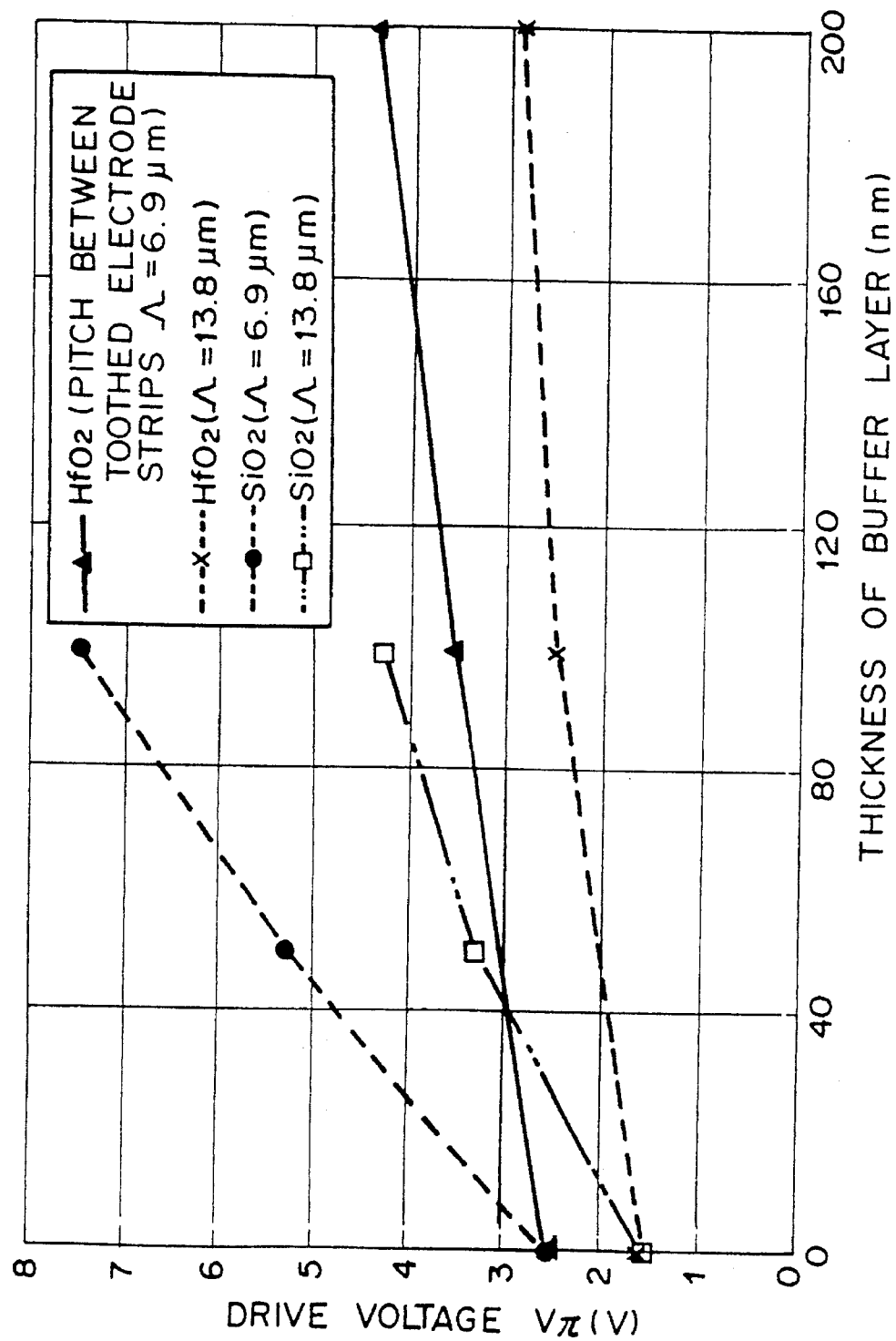
FIG. 3 is a graph showing a drive voltage V which leads to the maximum diffraction efficiency for each thickness of a buffer layer, when the buffer layer of the waveguide type electro-optical element is made of $HfO_2$ and when the buffer layer is made of $SiO_2$.

Upon reference to FIG. 3, the drive voltage will be described in detail. Graphs shown in FIG. 3 show a drive voltage $V_\pi$, which leads to the maximum diffraction efficiency, for each thickness of the buffer layer when the buffer layer 12 of the waveguide type electro-optical element shown in FIGS. 1 and 2 is respectively made of $HfO_2$ and $SiO_2$. AS can be seen from the graphs, in the case of the buffer layer 12 made of $HfO_2$, the drive voltage $V_\pi$ is low compared with the buffer layer consisting of $SiO_2$ when the thickness of the buffer is in a practical range of more than 100 nm.

Although a high-frequency-superimposed voltage is applied to the EOG electrode 13 in the above embodiment, the voltage is not necessarily limited to this. A DC voltage may be applied to the EOG electrode 13 instead of the superimposed voltage. However, when the high-frequency-superimposed voltage is applied to the EOG electrode, it is possible to prevent a phenomenon called DC drift, that is, variations in the characteristics of applied voltage vs diffraction efficiency occurring in accordance with the application of a voltage. For this reason, the high-frequency-superimposed voltage is more preferable than the DC voltage.

Figure 4:
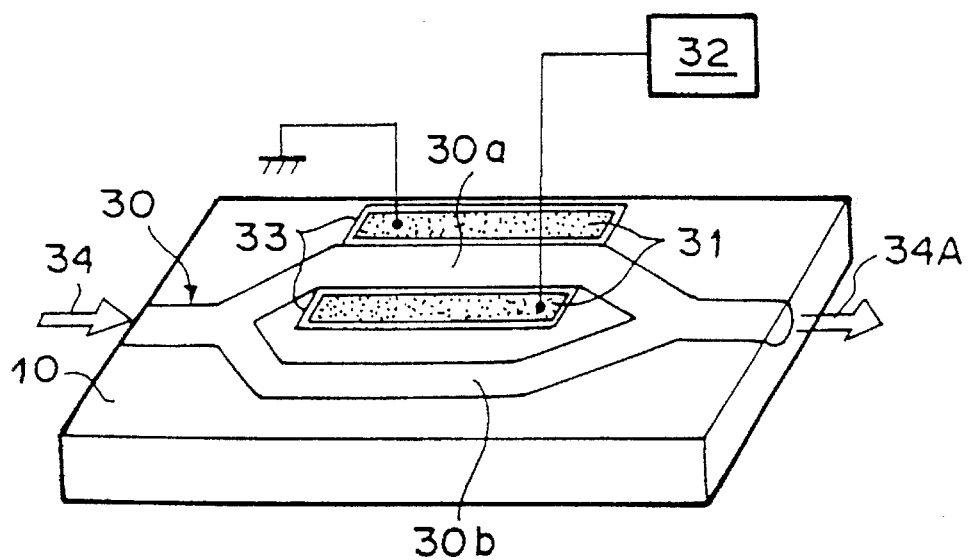
FIG. 4 is a perspective view showing a waveguide type electro-optical element in a second embodiment of the present invention.

A waveguide type electro-optical element in a second embodiment of the present invention will now be described with reference to FIG. 4. The electrode-optical element shown in FIG. 4 comprises a $LiNbO_3$ substrate 10 doped with MgO, a channel optical waveguide 30 which looks like the combination of two Y-shaped optical waveguides, a pair of planar electrodes 31, 31 formed on the substrate 10 so as to place one of the channels between the electrodes, and a modulation drive circuit 32 for applying a voltage to the planar electrodes 31, 31. Even in this case, a buffer layer 33 is disposed between the substrate 10 and each of the planar electrodes 31, 31.

In the waveguide type electro-optical element having the structure set forth above, an input beam 34 enters the channel optical waveguide 30 from the left end as shown in the drawing. The input beam 34 is then split into two beams by the first Y-shaped branch. These two beams are again combined at the second Y-shaped branch after having traveled through channels 30a and 30b. The combined beam is output as an output beam 34 from the right end of the channel optical waveguide 30 in the drawing.

When a voltage is applied to the channel 30a of the channel optical waveguide 30 via the electrodes 31, 31, the refractive index of the channel 30a is changed. As a result of this, the phase of the beam propagating through the channel 30a is modulated corresponding to the applied voltage. The beam having propagated through the channel 30a and the beam having propagated through the channel 30b interfere with each other when they are again combined together, and hence the intensity of the output beam 34A is modulated corresponding to the applied voltage.

Even in this embodiment, a result similar to that obtained in the first embodiment is obtained so long as the buffer layer 33 is made of material such as $HfO_2$ which has a specific resistance ranging between $10^7$ and $10^{11}$ Ωcm.

Figure 5:
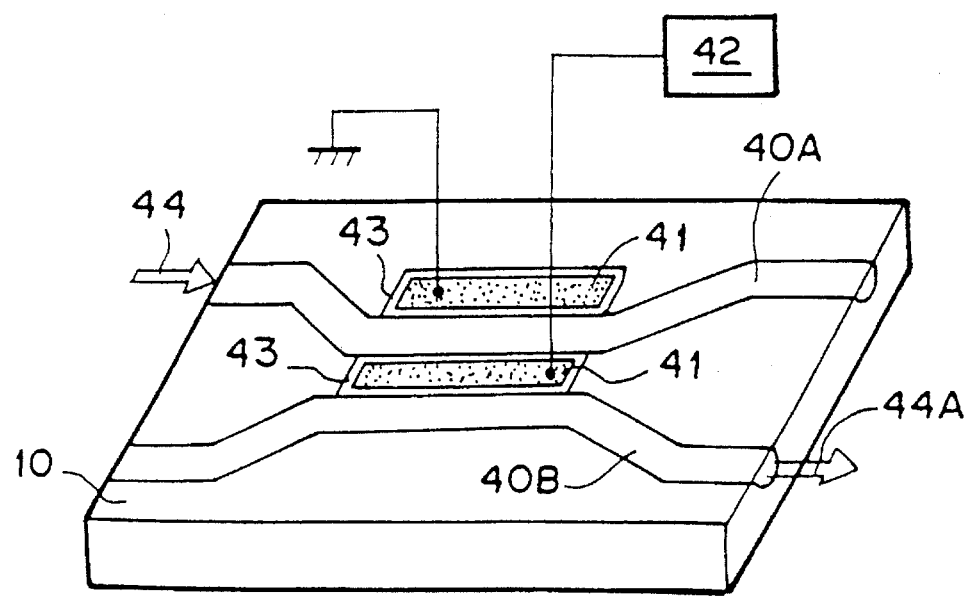
FIG. 5 is a perspective view showing a waveguide type electro-optical element in a third embodiment of the present invention.

A waveguide type electro-optical element in a third embodiment of the present invention will now be described with reference to FIG. 5. The electro-optical element shown in FIG. 5 comprises a $LiNbO_3$ substrate 10 doped with MgO, two channel optical waveguides 40A and 40B formed on the substrate 10 so as to constitute a directional coupler, a pair of planar electrodes 41, 41 formed on the substrate 10 in such a way as to put the channel optical waveguide 40A between the electrodes, and a modulation drive circuit 42 for applying a predetermined voltage to the planar electrodes 41, 41. As with the previous embodiments, buffer layer 43 is disposed between the substrate 10 and each of the planar electrodes 41.

In the waveguide type electro-optical element having the above structure, an input beam 44 enters the channel optical waveguide 40A and propagates through it. The beam 44 is shifted to the other channel optical waveguide 40B at a region where these two waveguides are positioned adjacent to each other. The switched optical beam travels through the waveguide 40B and is emitted as an output beam 44A.

When a voltage is applied to the electrodes the channel optical waveguide 40A via the electrodes 41, 41, the refractive index of the waveguide 40A is changed. As a result of this, a degree of shift of the guided beam from the waveguide 40A to the waveguide 40B is changed. In this way, the intensity of the output beam 44A is modulated corresponding to the applied voltage.

Even in this embodiment, a result similar to that obtained in the first embodiment is obtained so long as the buffer layer 43 is made of material such as $HfO_2$ which has a specific resistance ranging between $10^7$ and $10^{11}$ $\Omega$cm.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A waveguide type electro-optical element comprising:
    a substrate having an electro-optical effect;
    a waveguide formed on the substrate;
    at least one pair of electrodes formed on the substrate in close proximity to the waveguide; and
    a buffer region interposed between the waveguide and the electrodes, wherein the buffer region comprises material having a specific resistance substantially in a range of $10^7$–$10^{11}$ $\Omega$cm.

2. The waveguide type electro-optical element of claim 1, wherein the buffer region comprises $HfO_2$.

3. The waveguide type electro-optical element of claim 1, further comprising a drive circuit wherein the drive circuit applies a high frequency voltage between the electrodes.

4. The waveguide type electro-optical element of claim 2, further comprising a drive circuit wherein the drive circuit applies an a.c. voltage between the electrodes.

5. A waveguide type electro-optical element comprising:
    a substrate having an electro-optic effect;
    a waveguide formed on the substrate;
    a buffer layer formed on the waveguide, wherein the buffer layer comprises material having a specific resistance substantially in a range of $10^7$–$10^{11}$ $\Omega$cm; and
    at least one electrode formed on the buffer layer.

6. The waveguide type electro-optical element of claim 5, wherein the buffer layer comprises $HfO_2$.

7. The waveguide type electro-optical element of claim 6 further comprising a drive circuit, wherein the drive circuit applies a high frequency voltage to the electrode.

* * * * *